(12) United States Patent
Suzuki

(10) Patent No.: US 11,438,512 B2
(45) Date of Patent: Sep. 6, 2022

(54) ELECTRONIC APPARATUS AND CONTROL METHOD THEREOF

(71) Applicant: CANON KABUSHIKI KAISHA, Tokyo (JP)

(72) Inventor: Wataru Suzuki, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 44 days.

(21) Appl. No.: 17/197,499

(22) Filed: Mar. 10, 2021

(65) Prior Publication Data

US 2021/0289144 A1 Sep. 16, 2021

(30) Foreign Application Priority Data

Mar. 11, 2020 (JP) .............................. JP2020-042184

(51) Int. Cl.
*H04N 5/232* (2006.01)

(52) U.S. Cl.
CPC ................. *H04N 5/232945* (2018.08); *H04N 5/23299* (2018.08); *H04N 5/232127* (2018.08)

(58) Field of Classification Search
CPC ........ H04N 5/232945; H04N 5/23229; H04N 5/23212; H04N 5/23299; H04N 5/232127; H04N 5/23218
USPC .................................................... 348/333.03
See application file for complete search history.

(56) References Cited

U.S. PATENT DOCUMENTS

| | | | | |
|---|---|---|---|---|
| 8,208,017 B2* | 6/2012 | Oshima | .............. | H04N 5/23287 348/126 |
| 8,934,040 B2* | 1/2015 | Okazawa | ........... | H04N 5/23216 348/333.01 |
| 10,649,313 B2* | 5/2020 | Ota | ........................ | G03B 13/36 |
| 10,652,453 B2* | 5/2020 | Ota | .................. | H04N 5/232122 |
| 10,992,853 B2* | 4/2021 | Ogawa | ............. | H04N 5/232941 |
| 11,184,528 B2* | 11/2021 | Takeichi | .......... | H04N 5/232933 |
| 11,221,707 B2* | 1/2022 | Nishimura | ............ | G06F 3/0412 |
| 2001/0040636 A1* | 11/2001 | Kato | ................. | H04N 5/232933 348/E7.086 |
| 2007/0115383 A1 | 5/2007 | Tsukatani | | |
| 2007/0291114 A1* | 12/2007 | Oshima | .............. | H04N 5/23287 348/126 |
| 2011/0248942 A1* | 10/2011 | Yana | ................. | H04N 5/232945 345/173 |
| 2011/0261225 A1* | 10/2011 | Niinami | ........... | H04N 5/232123 382/103 |

(Continued)

FOREIGN PATENT DOCUMENTS

| | | |
|---|---|---|
| JP | 2013-243440 A | 12/2013 |
| JP | 2019-020508 A | 2/2019 |

OTHER PUBLICATIONS

The above patent document was cited in a European Search Report dated Dec. 16, 2021, that issued in the corresponding European Patent Application No. 21160388.1.

(Continued)

*Primary Examiner* — Pritham D Prabhakher

(74) *Attorney, Agent, or Firm* — Cowan, Liebowitz & Latman, P.C.

(57) ABSTRACT

An electronic apparatus, when an object included in a captured image is not moving, indicates a region of the captured image corresponding to the object in a first display appearance, and when the object is moving in the captured image, indicates the region in a second display appearance that is at least different in shape from the first display appearance.

28 Claims, 8 Drawing Sheets

(56) References Cited

U.S. PATENT DOCUMENTS

| | | | |
|---|---|---|---|
| 2016/0212358 A1* | 7/2016 | Shikata | H04N 5/247 |
| 2017/0302719 A1* | 10/2017 | Chen | H04N 19/167 |
| 2017/0366739 A1 | 12/2017 | Iwasaki | |
| 2018/0348470 A1 | 12/2018 | Suzuki | |
| 2019/0011805 A1* | 1/2019 | Ota | H04N 5/22525 |
| 2019/0180447 A1* | 6/2019 | Komiya | G06V 20/52 |
| 2019/0191101 A1* | 6/2019 | Ogawa | H04N 5/232941 |
| 2019/0313033 A1* | 10/2019 | Ota | H04N 5/232122 |
| 2020/0007779 A1 | 1/2020 | Ogawa | |

OTHER PUBLICATIONS

The above documents were cited in a European Partial Search Repod dated Jul. 28, 2021, that issued in the corresponding European Patent Application No. 21160388.1.

* cited by examiner

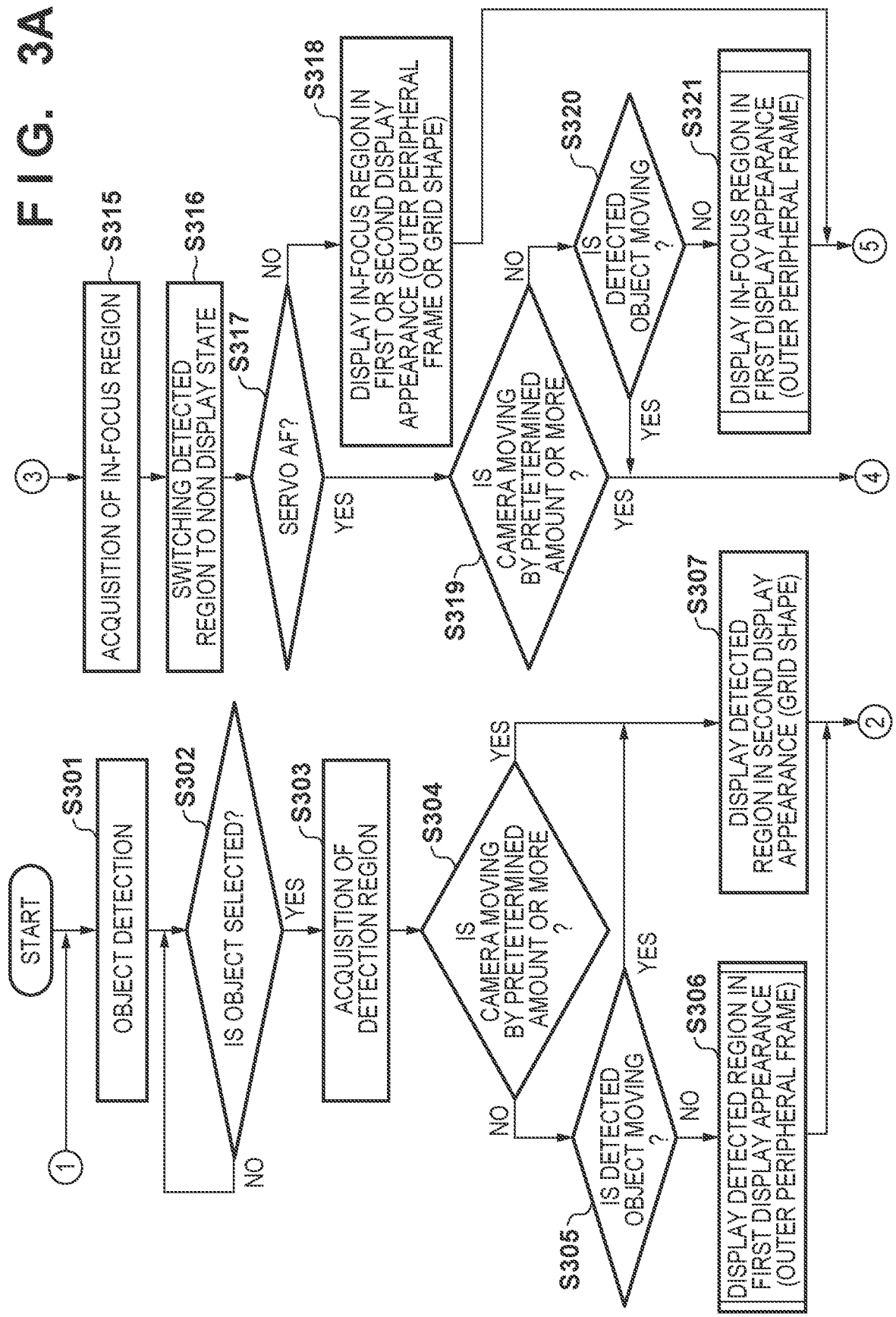

ELECTRONIC APPARATUS AND CONTROL METHOD THEREOF

BACKGROUND OF THE INVENTION

Field of the Invention

The present invention relates to a technique for displaying a region indicating an object in an image.

Description of the Related Art

It is disclosed in Japanese Patent Laid-Open No. 2019-20508 as a technique for displaying an object region of a tracking target and a focusing target, that a focus detection frame to be displayed and superimposed on an optical image is displayed by a point in the case of a face of a person, if not, by a rectangular focus detection frame.

In Japanese Patent Laid-Open No. 2019-20508, when an object is not a person and the object is not moving, in a case where a user is waiting for a shutter chance while viewing a state of the object, since a large number of the rectangular focus detection frames are displayed, it may be difficult to see the object. Also, even when the object is a person, it may be difficult to recognize which object is in focus when the object is moving.

SUMMARY OF THE INVENTION

The present invention has been made in consideration of the aforementioned problems, and improves visibility when displaying a region indicating the object in the image.

In order to solve the aforementioned problems, the present invention provides an electronic apparatus comprising: at least one processor and/or at least one circuit to perform operations of: in a case that an object included in a captured image is not moving, indicating a region of the captured image corresponding to the object in a first display appearance, and in a case that the object is moving in the captured image, indicating the region in a second display appearance that is at least different in shape from the first display appearance.

In order to solve the aforementioned problems, the present invention provides a method of controlling an electronic apparatus, the method comprising: performing control such that in a case that an object included in a captured image is not moving, a region of the captured image corresponding to the object is indicated in a first display appearance, and in a case that the object is moving in the captured image, the region is indicated in a second display appearance that is at least different in shape from that of the first display appearance.

In order to solve the aforementioned problems, the present invention provides a non-transitory computer-readable storage medium storing a program for causing a computer to execute operations of: controlling such that in a case that an object included in a captured image is not moving, a region of the captured image corresponding to the object is indicated in a first display appearance, and in a case that the object is moving in the captured image, the region is indicated in a second display appearance that is at least different in shape from that of the first display appearance.

In order to solve the aforementioned problems, the present invention provides an electronic apparatus comprising: at least one processor and/or at least one circuit to perform operations of: displaying on a screen of a display unit, a captured image and a graphic indicating a region corresponding to an object included in the captured image, wherein the region is configured by of at least one of a plurality of unit regions included in the screen; and in a case that the region includes two or more unit regions, an outer peripheral frame of the region and an inner grid of the region are displayed in difference display appearances each other in the graphic to be displayed on the screen.

In order to solve the aforementioned problems, the present invention provides a method of controlling an electronic apparatus, the method comprising: displaying on a screen of a display unit, a captured image and a graphic indicating a region corresponding to an object included in the captured image, wherein the region is configured by of at least one of a plurality of unit regions included in the screen, and in the displaying, in a case that the region includes two or more unit regions, an outer peripheral frame of the region and an inner grid of the region are displayed in difference display appearances each other in the graphic to be displayed on the screen.

In order to solve the aforementioned problems, the present invention provides a non-transitory computer-readable storage medium storing a program for causing a computer to execute operations of: displaying on a screen of a display unit, a captured image and a graphic indicating a region corresponding to an object included in the captured image, wherein the region is configured by of at least one of a plurality of unit regions included in the screen, and in a case that the region includes two or more unit regions, an outer peripheral frame of the region and an inner grid of the region are displayed in difference display appearances each other in the graphic to be displayed on the screen.

According to the present invention, it is possible to improve the visibility when displaying the region indicating the object in the image.

Further features of the present invention will become apparent from the following description of exemplary embodiments (with reference to the attached drawings).

BRIEF DESCRIPTION OF THE DRAWINGS

FIGS. 3A and 3B are flowcharts illustrating a display control of the present embodiment.

DESCRIPTION OF THE EMBODIMENTS

Figure 1A:
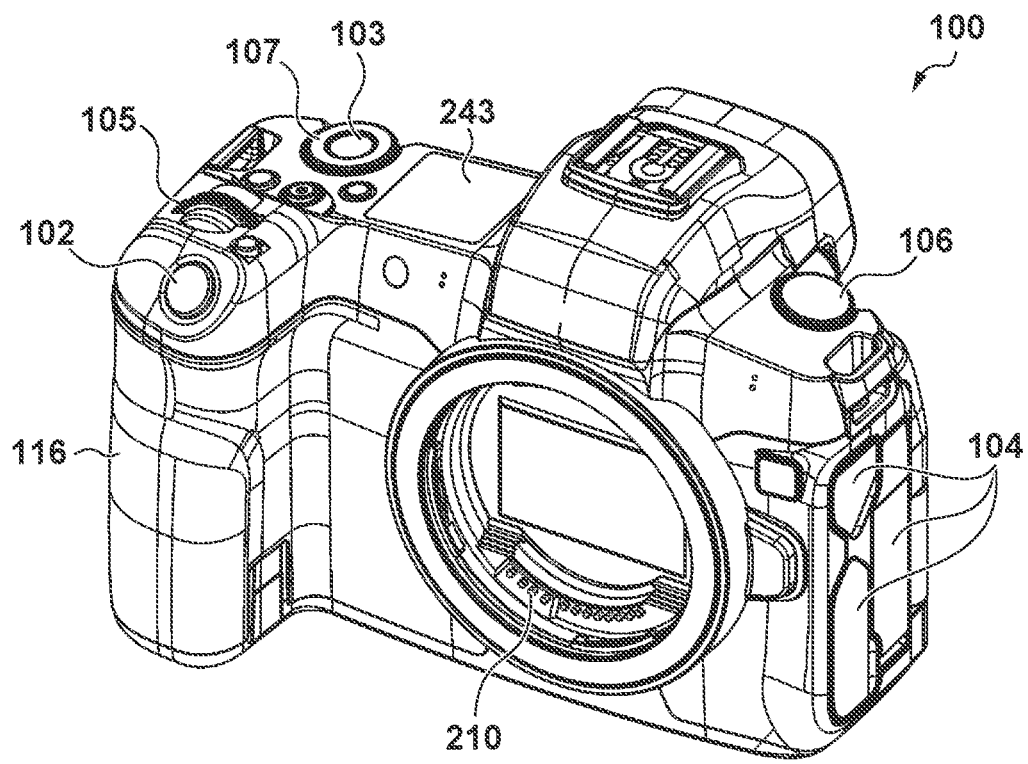
FIGS. 1A and 1B are external views of a digital camera of a present embodiment.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, embodiments in which an electronic apparatus of the present invention is applied to a single-lens reflex digital camera capable of shooting a still image and/or a moving image will be described in detail with reference to the accompanying drawings.

<Apparatus Configuration>

Figure 1B:
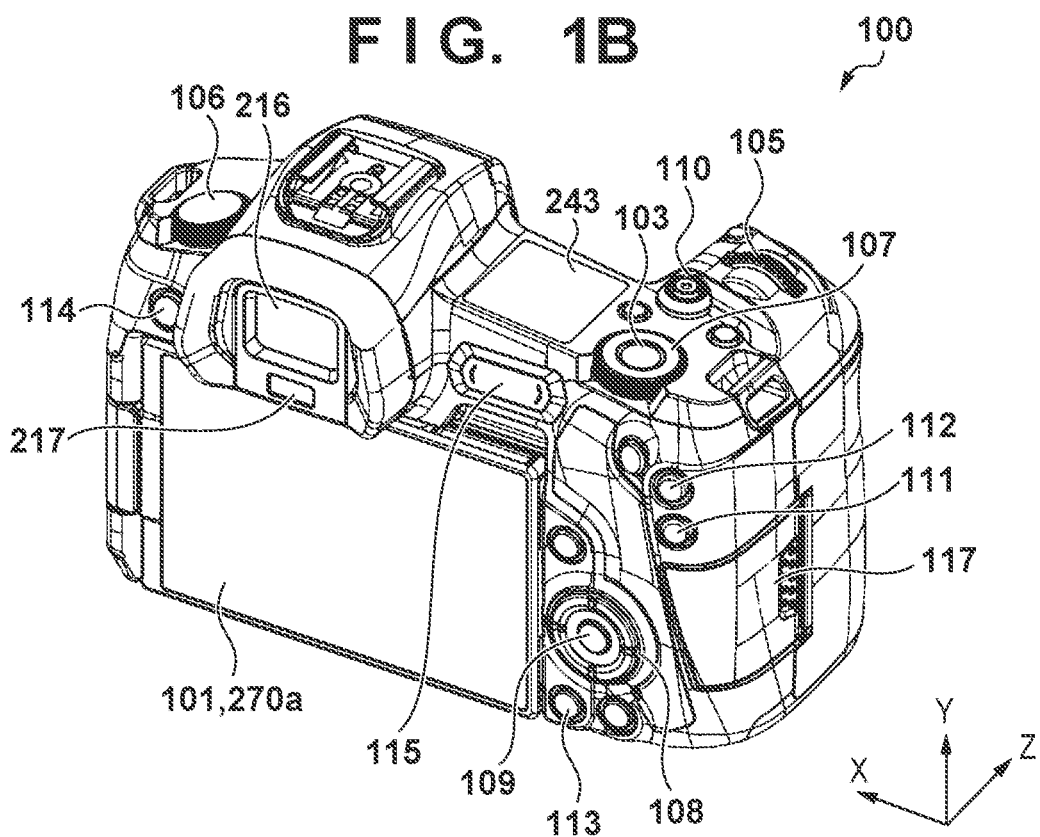
Figure 2:
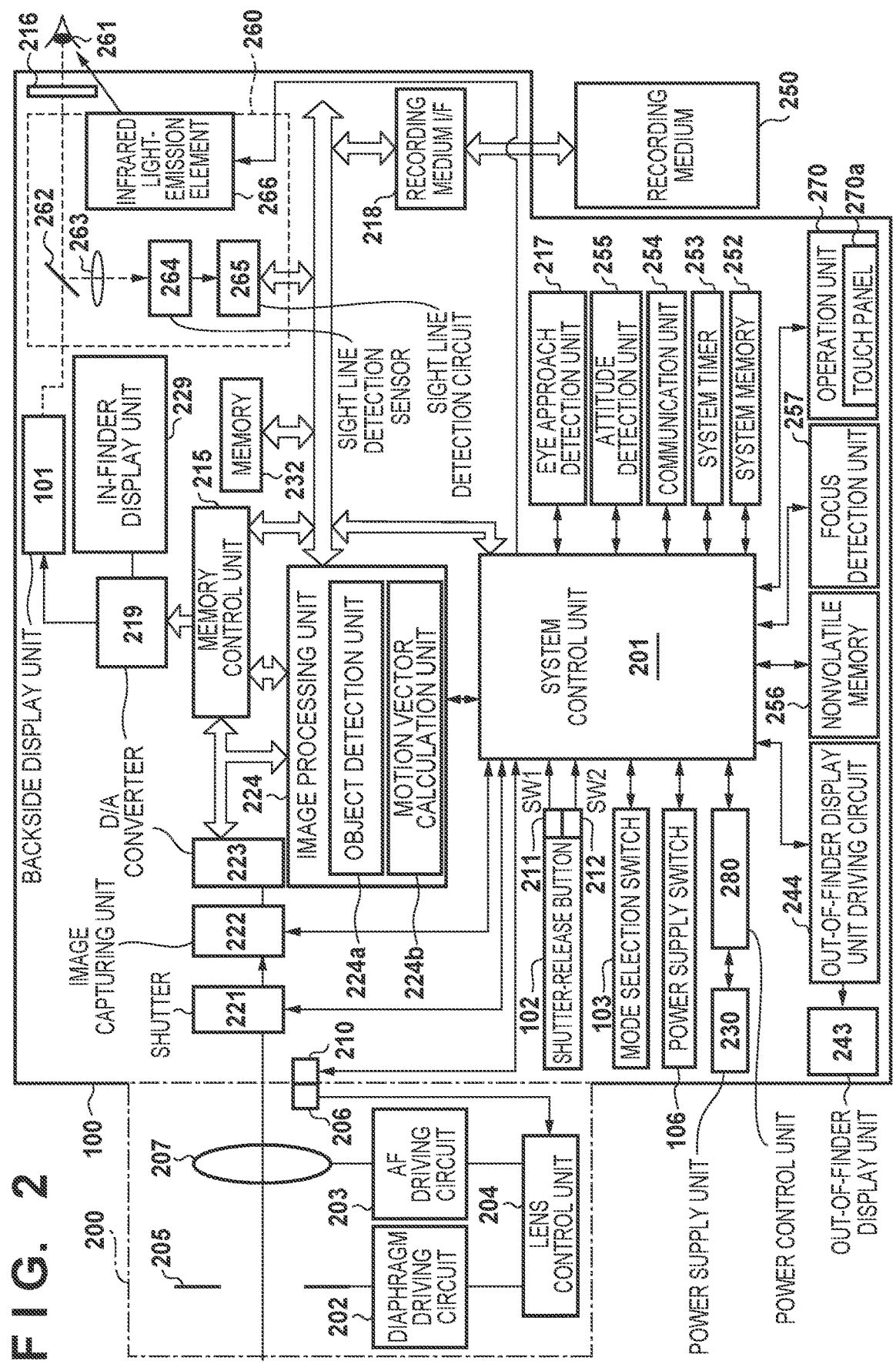
FIG. 2 is a block diagram illustrating a configuration of the digital camera of the present embodiment.

With reference to FIGS. 1A, 1B and 2, the configuration and functions of a digital camera 100 according to the present embodiment will be described.

FIG. 1A is a front perspective view of the digital camera 100 in a state where a lens unit 200 is detached. FIG. 1B is a back perspective view of the digital camera 100.

In FIGS. 1A and 1B, a backside display unit 101 is a display device for displaying images and various types of information such as an LCD provided on the back surface of the camera body. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch operation member capable of detecting contact (touch operation) with the display surface (operation surface of the touch panel 270a) of the backside display unit 101.

An out-of-finder display unit 243 is a display device provided on the upper surface of the camera body, and displays various setting values of the camera such as a shutter speed and a diaphragm aperture. A shutter-release button 102 is an operation member for giving a shooting instruction. A mode selection switch 103 is a dial type operation member for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is a rotating operation member that will be described later with reference to FIG. 2, and can move a selected frame, scroll images, and/or the like. A cross key 108 is also a movement instruction member included in the operation units 270 that will be described later with reference to FIG. 2, and is a four-directional operation button having push buttons that can be pressed in four directions of up, down, left, and right. The operation can be performed according to the portion of the cross key 108 pressed in the pressed direction. A SET button 109 is also a push button included in the operation units 270 that will be described later with reference to FIG. 2, and is mainly used for determining a selection item and/or the like.

A video recording button 110 is also included in operation units 270 that will be described later with reference to FIG. 2, and is used to instruct start and stop of moving image shooting (recording). An AE lock button 112 is also included in the operation units 270 that will be described later in FIG. 2, and can fix an exposure state by being pressed in a shooting standby state. An enlargement/reduction button 111 is also included in the operation units 270 that will be described later in FIG. 2, and is an operation button for turning on/off of an enlargement mode during alive view display in the shooting mode. By operating the main electronic dial 105 after turning on of the enlargement mode, the live view image can be enlarged or reduced. In the reproduction mode, the main electronic dial 105 functions as an enlargement button for enlarging a reproduced image and increasing an enlargement ratio.

A reproduction button 113 is also an operation button included in the operation units 270 that will be described later in FIG. 2, and is an operation button for switching the operation mode of the digital camera 100 to the shooting mode or the reproduction mode. By pressing the reproduction button 113 during the shooting mode, the operation mode is switched to the reproduction mode, and the latest image among the images recorded on the recording medium 250 can be displayed on the backside display unit 101. A menu button 114 is also included in the operation units 270 that will be described later in FIG. 2, and a menu screen on which various settings can be made can be displayed on the backside display unit 101 when pressed. The user can intuitively perform various settings using the menu screen displayed on the backside display unit 101, the cross key 108 and the SET button 109 or the multi-controller 115. A multi-controller 115 is also included in the operation unit 270 that will be described later with reference to FIG. 2, and is an operation member, i.e., an operation bar, which can be slid in the lateral direction, and can assign various functions to the slide operation and the touch operation at both ends.

A grip portion 116 has a shape that makes it easy to be grasped by a user's a right hand when he or she holds the digital camera 100. The shutter-release button 102 and the main electronic dial 105 are arranged at positions where the grip portion 116 can be operated by the index finger of the right hand while holding the digital camera 100 by gripping the grip portion 116 with the little finger, the ring finger and the middle finger of the right hand. In the same state, the sub electronic dial 107 is arranged at a position operable with the thumb of the right hand. A lid 117 is a member for opening or closing a slot for mounting/removing the recording medium 250 to/from the digital camera 100.

A communication terminal 210 is an electric contact point for the digital camera 100 to perform communication with the lens unit 200. An eyepiece part 216 is a look-through type eyepiece finder. The user can visually recognize an image displayed on an electronic viewfinder (EVF) which is the in-finder display unit 229 through the eyepiece part 216, and can confirm the focus and composition of the captured object image through the lens unit 200 that will be described later in FIG. 2.

An eye approach detection unit 217 is arranged near the eyepiece part 216, and can detect approach of any object to the eyepiece part 216. As the eye approach detection unit 217, for example, an infrared proximity sensor is used.

Next, with reference to FIG. 2, the internal configuration of the digital camera 100 and the lens unit 200 of the present embodiment will be described, In FIG. 2, components that are the same as those in FIGS. 1A and 1B are denoted by the same reference numerals.

In FIG. 2, the lens unit 200 is equipped with a shooting lens 207, and is detachable from the digital camera 100. The shooting lens 207 is usually constituted by a plurality of lenses, but is simplified here and is shown by one lens. A communication terminal 206 is an electric contact point for the lens unit 200 to perform communication with the digital camera 100. The communication terminal 210 is an electric contact point for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focus detection unit 257 outputs a defocus amount to the system control unit 201, the system control unit 201 communicates with the lens unit 200, and in accordance with the defocus amount, performs control relating to an automatic focus processing in a phase difference detection method. Note that the AF method is not limited to the phase difference detection method, it may be a contrast detection method.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts an analog signal output from the image capturing unit 222 into a digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. Digital data output from the A/D converter 223 is directly written into the memory 232 via both the image processing unit 224 and the memory control unit 215 or via the memory control unit 215. The memory 232 stores image data obtained from the image capturing unit 222 and the A/D converter 223, and display data for displaying the image on the backside display unit 101 or the in-finder display unit 229. The memory 232 has a storage capacity that is sufficient for storing a predetermined number of still images as well as moving images and audio of a predetermined time period. The memory 232 also functions as a memory for image display (video memory).

A D/A converter 219 converts the display data for the image stored in the memory 232 into an analog signal and supplies the backside display unit 101 or the in-finder display unit 229 with the analog signal. The display data for the image that was written into the memory 232 is displayed by the backside display unit 101 or the in-finder display unit 229 via the D/A converter 219. The backside display unit 101 and the in-finder display unit 229 display on the display device in accordance with the analog signal from the D/A converter 219. In this manner, the digital signals stored in the memory 232 are converted into analog signals, and the analog signals are successively transmitted to the backside display unit 101 or the in-finer display unit 229 so as to be displayed thereon, making it possible to function as an electronic view finder (EVF) and to perform live view (LV) display (through the lens-image display).

The image processing unit 224 includes an object detection unit 224*a*, and detects an object region from image data stored in the memory 232. An object detection method (face detection processing, color detection processing) for detecting an object based on face information or color information included in image data will be described.

The face detection processing is processing for detecting a face region existing in the image data by a known algorithm. For example, the object detection unit 224*a* extracts a feature amount from a partial region in a square shape on image data, and compares the feature amount with a feature amount of a face prepared in advance. When the correlation between both feature amounts exceeds a predetermined threshold, the object detection unit 224*a* determines that the partial region is a face region. By repeating this determination while changing the combination of the size, the arrangement position, and the arrangement angle of the partial regions, it is possible to detect various face regions that exist in the image data. The color detection processing is executed when the object is an object (a "thing" other than a person), and the color information of the object region is stored as a feature color. As the color information, an RGB, a luminance Y, a chrominance R-Y, B-Y, or the like, which are output signals from the image processing unit 224, are used. At the time of the object detection, the object detection unit 224*a* divides the image data into a plurality of partial regions, and calculates an average value of luminance and color difference for each partial region. In addition, the object detection unit 224*a* compares the feature color information stored in advance with the color information of each region at the time of the object detection, and sets a partial region in which the differences between the luminance and the color difference is not more than a predetermined amount as a candidate of the object region. The blocks of the partial regions which were set as the region candidate and are adjacent to each other are regarded as the same color region, and a region in which the same color region falls within a predetermined size range is regarded as the final object region.

The image processing unit 224 includes a motion vector calculation unit 224*b*, and calculates a motion vector amount of an object based on an object region detected from a plurality of image data each of which an image captured time is different stored in the memory 232.

Various setting values of the camera such as a shutter speed and a diaphragm aperture are displayed on the out-of-finder display unit 243 via an out-of-finder display unit driving circuit 244.

A nonvolatile memory 256 is an electrically erasable/recordable memory, and for example, a flash ROM or the like is used. In the nonvolatile memory 256, constants and programs, for example, for operating the system control unit 201 are stored. In this context, "programs" may refer to programs for executing flowcharts that will be described later.

The system control unit 201 is an arithmetic processing device comprising at least one processor or circuit, overall controlling the entire digital camera 100. The system control unit 201 realizes, by executing the programs stored in the nonvolatile memory 256, the procedures of the flowchart that will be described later. As the system memory 252, for example, RAM is used, the system memory 252 is used also as a work memory where constants and variables for operating the system control unit 201, and the programs read out from the nonvolatile memory 256 are expanded. The system control unit 201 controls the memory 232, the D/A converter 219, the backside display unit 101, the in-finder display unit 229, and/or the like, so as to perform display control. A system timer 253 is a time measurement unit for measuring time periods for various types of controls and the time of an inner clock.

The mode selection switch 103, a first shutter switch 211, a second shutter switch 212, and the operation units 270 are operation devices for inputting various types of operating instructions to the system control unit 201. The mode selection switch 103 switches the operation mode of the system control unit 201 to any of a still image shooting mode, a moving image shooting mode, and a reproduction mode. The still image shooting mode includes an automatic shooting mode, an automatic scene determination mode, a manual mode, aperture-priority mode (Av mode), shutter-priority AE mode (Tv mode), and program AE mode (P mode), for example. The still image shooting mode also includes various scene modes each for which scene-specific shooting setting is made, custom mode, and/or the like.

The user may directly switch to any of these shooting modes by operating the mode selection switch 103, or may switch to any of the shooting modes using another operation member after once being switched to a list screen of the operation modes with the mode selection switch 103 and selecting any of the plurality of shooting modes displayed in a list. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 starts shooting preparation operations such as AF (auto focus) processing, AE (auto exposure) processing, AWB (auto white balance) processing, and EF (flash pre-emission) processing.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of the captured image data as an image file to the recording medium 250.

The operation units 270 comprise operation members such as various switches and buttons for accepting various operations from a user, and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the video recording button 110, the AE lock button 112, the enlargement/reduction button 111, the reproduction button 113, and the menu button 114. Further, the operation units 270 include a selection switch of the AF modes. The AF mode includes a one-shot AF that fixes the focus on a stationary object while the shutter-release button 102 is being pressed halfway, and a servo AF that keeps the focus on a moving object. The servo AF is a mode that continues to perform the lens driving so as to follow the movement of the object even after focusing. On the other hand, the one-shot AF does not perform the lens driving again until the shutter-release button 102 is released when once focused, and is a mode in which the shutter cannot be released until focused. It is also possible to automatically switch between these AF modes (AI focus AF).

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each component including the recording medium 250.

A power supply unit 230 comprises a primary battery such as an alkaline battery or a lithium battery, and a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and is constituted by a semiconductor memory, a magnetic disk, or the like.

A communication unit 254 communicably connects an external device by a wireless antenna or a cable, and transmits and receives a video signal, an audio signal, and/or the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or WirelessUSB, or a wired connection device such as a USB cable, HDMI®, IEEE 1394, or the like.

An attitude detection unit 255 detects the attitude (orientation) of the digital camera 100 with respect to the gravity direction. Based on the attitude detected by the attitude detection unit 255, it is possible to discriminate whether an image captured by the image capturing unit 222 has been shot by setting the digital camera 100 in the landscape or portrait direction. The system control unit 201 can add orientation information corresponding to the attitude detected by the attitude detection unit 255 to the image file, and rotate and record the captured image. An acceleration sensor, gyro sensor or the like may be used as the attitude detection unit 255. The attitude detection unit 255 can also detect the movement (pan, tilt, lift, rest, etc.) of the digital camera 100 by using the acceleration sensor or the gyro sensor.

Included among the operation units 270 is also the touch panel 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated.

As a result, a GUI can be constructed so as to make it possible for the user to directly manipulate the screen displayed on the backside display unit 101. The system control unit 201 is capable of detecting the following touch operations and/or conditions performed by contacting the touch panel 270a.

Newly touching of the touch panel 270a by a finger or pen which has not been in contact with the touch panel 270a, that is, a start of the touch (referred to as "touch-down" below)

A state in which the touch panel 270a is in contact with a finger or pen (referred to as "touch-on" below).

Movement of a finger or pen while in contact with the touch panel 270a (referred to as "touch-move" below).

Releasing a finger or pen that has been in contact with the touch panel 270a, that is, an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a.

As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

When the touch-move operation is performed in the eye approaching state, the user can set the method of designating the position indicator according to the touch-move operation to either an absolute position designation or a relative position designation. For example, if the position indicator is an AF frame, in the case of the absolute position designation, if there is the touch-down on the touch panel 270a, the AF position associated with the touched-down position (the position at which coordinates are input) is set regardless of the AF position (current AF position) set before the touch-down. That is, the position coordinates at which the touch operation is performed and the position coordinates of the backside display unit 101 are associated with each other. On the other hand, in the case of the relative position designation, the position coordinates in which the touch operation is performed and the position coordinates of the backside display unit 101 are not associated with each other. In the relative position designation, the AF position does not move at the time of touch-down. If there is the touch-move after the touch-down is performed, the AF position is moved in a movement direction of the touch-move from the AF position (current AF position) set before the touch is performed by only a distance corresponding to the movement amount of the touch-move, regardless of the touch-down position on the touch panel 270a.

The eye approach detection unit 217 detects whether an eye (an object) has approached (eye approaching) or has moved away from (eye detached) the eyepiece part 216 (approach detection). The system control unit 201 switches the backside display unit 101 and the in-finder display unit 229 between displaying (a display state) and not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

If an object has approached, infrared light irradiated from a light emitting unit (not illustrated) of the eye approach detection unit 217 is reflected and is made to be incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from a non-eye approaching state (no approach state), the eye approach detection unit 217 determines that eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is a non-eye approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as an eye approaching.

<Display Control>

Next, with reference to FIGS. 3A and 3B, a live view display control processing at the time of detecting an object and at the time of detecting a focus by the digital camera 100 according to the present embodiment will be described.

Figure 3B:
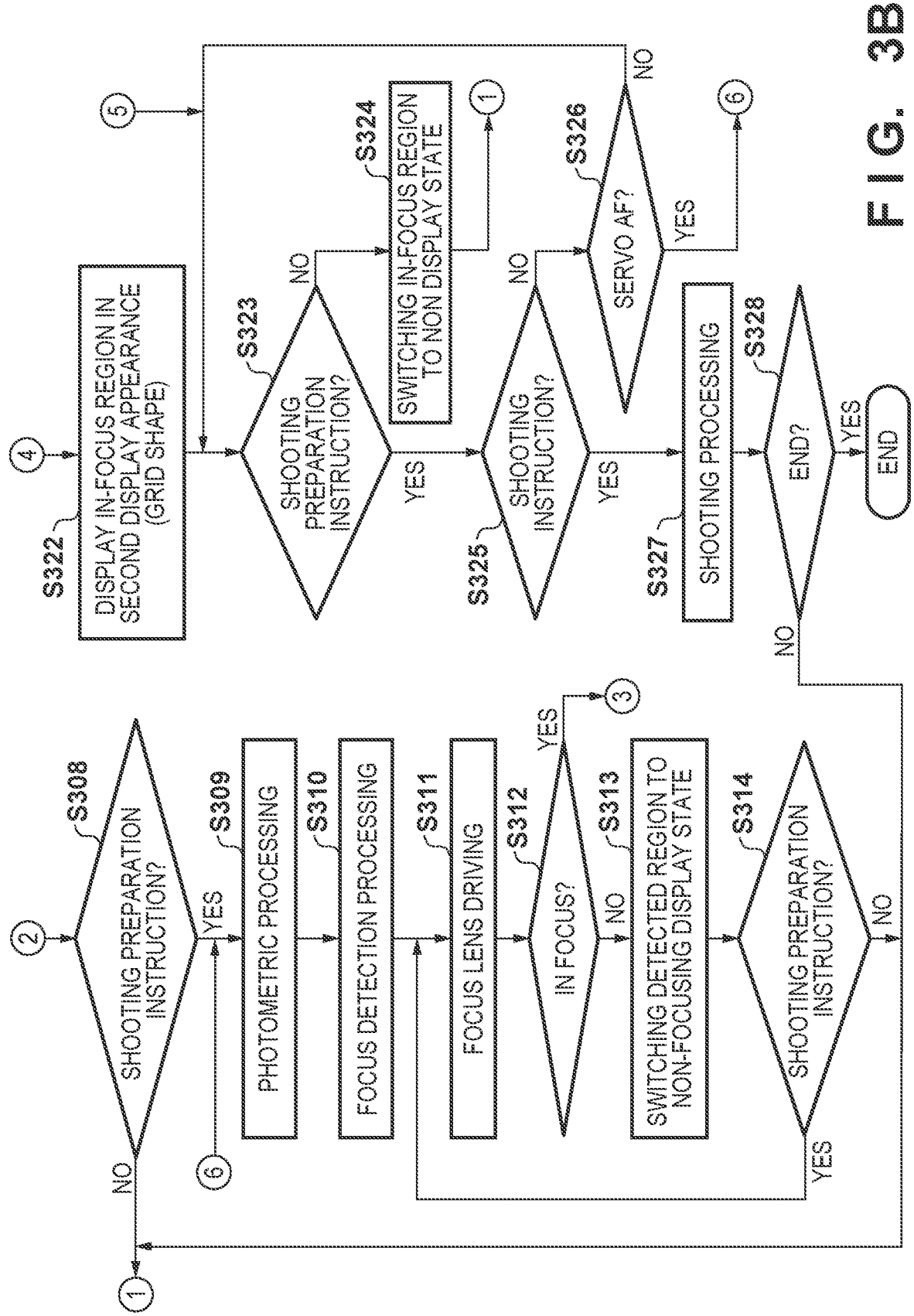

Note that the processing of FIGS. 3A and 3B is realized by expanding the programs stored in the nonvolatile memory 256 into the system memory 252, executing the programs by the system control unit 201, and controlling the respective components. When the power of the digital camera 100 is turned on, the shooting mode is selected, and the AF mode is set, the system control unit 201 initials flags, control variables, and/or the like, displays a live view on the backside display unit 101, and superimposes and displays information indicating camera setting values on the live view with icons. Thereafter, the processing of FIGS. 3A and 3B is started when the photographer sets the object in the angle of view while viewing the backside display unit 101. The processing of FIGS. 3A and 3B is executed when the number of AF frames that can be focused is not less than a predetermined number, or when the AF frames are smaller than a predetermined size. An object detection frame may be included.

Processing of steps S301 to S307 is processing of displaying the region where the object is detected on the backside display unit 101, and is processing of tracking the captured object. Note that, in steps S304 and S305, the state where the camera or the object is moving corresponds to the state where the position of the object in the captured image is moving by an amount that is not less than a predetermined amount, and the state where the camera and the object is not moving corresponds to the state where the position of the object in the captured image is not moving by the amount that is not less than the predetermined amount.

In step S301, the system control unit 201 performs detection processing of an object within a shooting angle of view by the object detection unit 224a of the image processing unit 224.

In step S302, the system control unit 201 determines whether or not a specific object is selected from the objects detected by the object detection unit 224a if it is determined that the specific object has been selected, the processing proceeds to step S303, and otherwise the processing is repeated until the specific object has been selected.

In step S303, the system control unit 201 acquires the region information of the object selected in step S302 by the image processing unit 224.

In step S304, the system control unit 201, based on the information acquired by the attitude detection unit 255, whether the digital camera 100 is moving by an amount that is not less than the predetermined amount, that is, whether or not the photographer is moving the digital camera 100 at a predetermined amount or more of speed. If it is determined that the digital camera 100 is moving, the processing proceeds to step S307, and otherwise, the processing proceeds to step S305. The predetermined amount indicates, for example, rotation at an angle of 90 degrees or more or 60 degrees or more per second.

Figure 4:
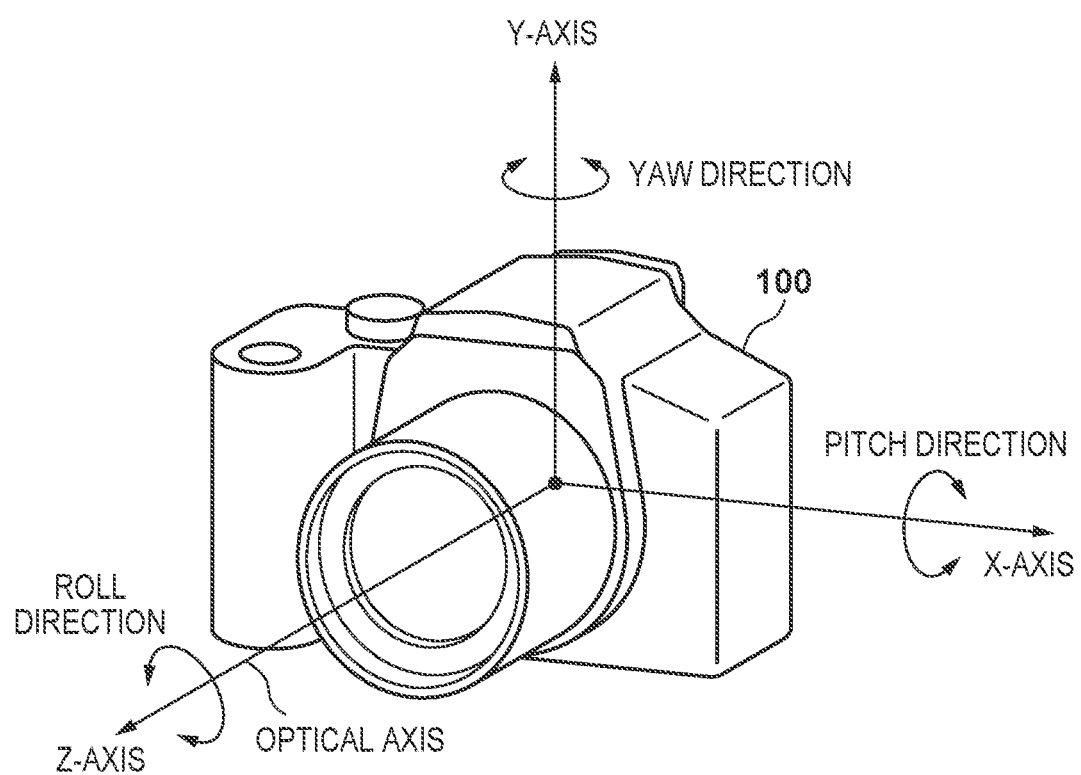
FIG. 4 is a diagram exemplifying parameters of movement of the digital camera of the present embodiment.

FIG. 4 illustrates, as the movement of the digital camera 100 detected by the attitude detection unit 255 of the present embodiment, the pitch (Pitch) direction, the yaw (Yaw) direction and the roll (Roll) direction. It is defined that the optical axis of the image capturing optical system of the digital camera 100 is the Z-axis, the vertical direction at the positive position is the Y-axis, and a direction perpendicular to the Y-axis and the Z-axis is the X-axis. The pitch direction is a direction around the X-axis (tilt direction), the yaw direction is a direction around the Y-axis (pan direction), the roll direction is a direction around the Z-axis (the direction in which the image capturing plane rotates in a plane perpendicular to the optical axis). That is, the pitch direction is a direction inclined in the vertical direction with respect to the horizontal plane, the yaw direction is a direction inclined in the horizontal direction with respect to the vertical plane, and these directions are perpendicular to each other.

Information of the movement of the digital camera 100 to be acquired from the attitude detection unit 255 includes the amount of change in angle in the pitch direction, the roll direction and the yaw direction, and at least one of the movement amount in the X-axis direction and the Y-axis direction. Then, a predetermined threshold is provided for each of these values, and if there is any one of the values that exceeds the threshold, it is determined that the photographer is moving the digital camera 100, that is, the digital camera 100 is moving. For example, in addition to the amount of change in the angle described above, it may be determined that the digital camera 100 is moving in accordance with a unit of time such as in a case where the digital camera 100 in the X-axis direction has moved not less than 5 cm in one second or the angle in the tilt direction has rotated not less than ±50 degrees in one second.

In step S305, the system control unit 201 determines whether or not the detected object is moving based on the motion vector amount of the object calculated by the motion vector calculation unit 224b of the image processing unit 224. If it is determined that the detected object is moving, the processing proceeds to step S307, otherwise, the processing proceeds to step S306.

In step S306, the system control unit 201 superimposes and displays a graphic indicating the detected region of the object acquired in step S303 on the live view displayed on the backside display unit 101 in a first display appearance (outer peripheral frame).

In step S307, the system control unit 201 superimposes and displays a graphic indicating the detected region of the object acquired in step S303 on the live view displayed on the backside display unit 101 in a second display appearance (grid shape).

Figure 5A:
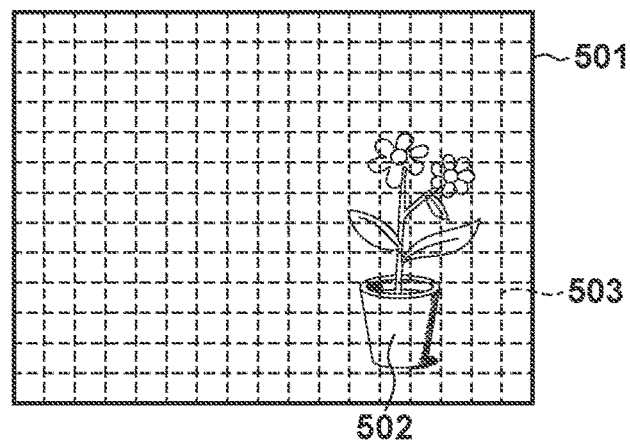
FIGS. 5A and 5B are diagrams exemplifying an object detected region of the present embodiment.
Figure 5B:
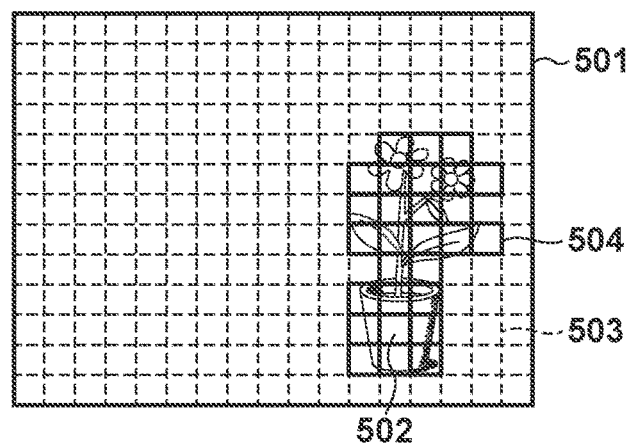

Here, with reference to FIGS. 5A and 5B, the detected region of the object acquired in step S303 will be described. A display region 501 indicates a display screen of the backside display unit 101. FIG. 5A illustrates a state where an object 502 is included in the display region 501. The dotted line 503 indicates a boundary line when the display region 501 is divided into regions with rectangles of the same shape. In the present embodiment, the display region 501 and the detectable region of the object are described to be coincident with each other, but they do not necessarily have to coincide with each other. Further, in the present embodiment, among the rectangular regions divided by the dotted line 503 as a border line, the sum of sets of rectangular regions on which part of the object overlaps is assumed to be the detected region of the object, and to be the region information to be acquired in step S303. Therefore, the detected region of the object 502 in FIG. 5B becomes a rectangle sum of sets of regions 504 surrounded by a bold line.

Next, with reference to FIGS. 6A and 6B, a display appearance of a detected region of an object in steps S306 and S307 will be described.

Figure 6A:
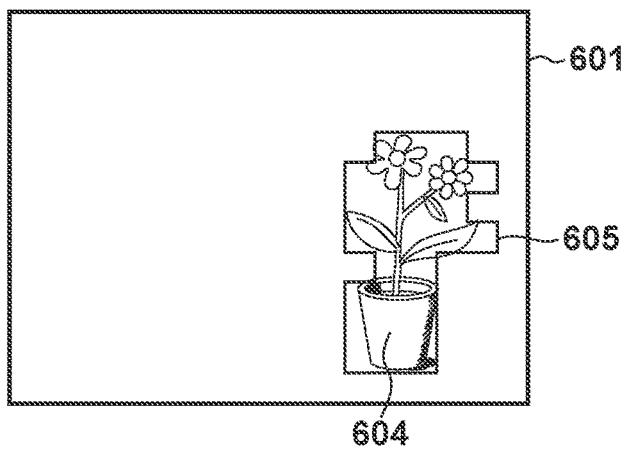
FIGS. 6A and 6B are diagrams exemplifying a display appearance of an object region of the present embodiment.

FIG. 6A exemplifies a first display appearance of a detected region of an object, and exemplifies a state in which an object 604 is included in a display region 601 of the backside display unit 101. Of the rectangular regions obtained by dividing the display region 601 in the same shape, those obtained by displaying all rectangles corresponding to the detected region of the object 604 obtained in step S303 is a sum of sets of regions 504 shown in FIG. 5B, which corresponds to a second display appearance for displaying the object region in a grid shape. Those displaying the rectangular sides constituting the outer periphery of the sum of sets of regions 504 is an outer peripheral frame 605 shown in FIG. 6A, which corresponds to the first display appearance showing the outer shape of the object region.

Figure 6B:
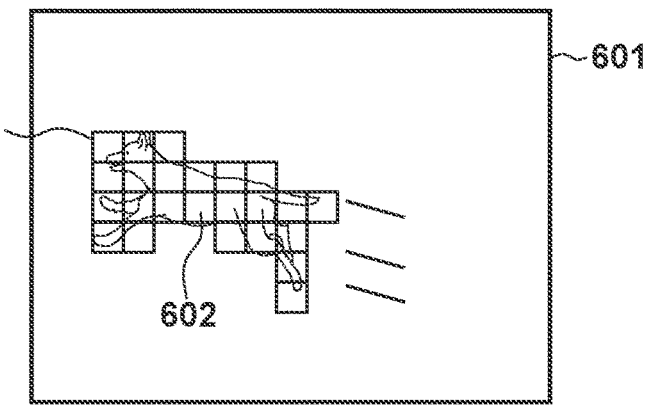

FIG. 6B exemplifies a second display appearance of the detected region of the object, and exemplifies a state in which the object 602 is included in the display region 601 of the backside display unit 101. Among the rectangular regions obtained by dividing the display region 601 in the same shape, those obtained by displaying all rectangles corresponding to the detected region of the object 602 obtained in step S303 is a sum of sets of regions 603. The second display appearance displays all four sides of each rectangle included in the sum of sets of regions 603.

In the present embodiment, the second display appearance is defined by dividing the display area in a rectangle of the same shape, and displaying all four sides of the rectangle on which part of the object overlaps among the divided rectangular regions. Further, the first display appearance is defined by displaying only rectangular sides constituting the outer periphery of the sum of sets of regions of the rectangles on which part of the object overlaps. However, in the first display appearance, in addition to the outer peripheral frame, an inner grid of which a line width is thinner than the outer peripheral frame may be displayed. Further, in addition to the outer peripheral frame, an inner grid of which a transmittance is closer to being transparent than the outer peripheral frame may be displayed. Further, in addition to the outer peripheral frame, an inner grid of which a luminance is lower than the outer peripheral frame may be displayed. Further, the present invention is not limited to the lattice shape or the outer peripheral frame thereof, as long as the number of pixels to be drawn in the first display appearance is smaller than that in the second display appearance in the drawing area for displaying the detected region on the backside display unit 101. Further, the figure of the same shape dividing the display area is not limited to a rectangle, and the display area may be divided to represent the detected region of the object as an example, and is not limited to this.

Note that between steps S303 and S304, the system control unit 201 may acquire the current AF mode, and the processing proceeds to step S304 if the AF mode is the servo AF, and the processing proceeds to step S306 if the AF mode is the one-shot AF.

Further, a predetermined threshold value for comparing with the information acquired from the attitude detection unit 255 in step S305 may be changed by an enlargement ratio of at least one of an optical zoom and a digital zoom. For example, if the enlargement ratio is five times, the threshold of the rotation angle of the unit time of the tilt direction and the yaw direction may be changed to one fifth. Furthermore, by acquiring information of the lens mounted on the digital camera 100, the threshold may be changed based on the type and focal length of the lens included in the acquired information. For example, when a fixed focal length lens having a focal length of 300 mm is mounted, the threshold of the rotation angle of the unit time of the tilt direction and yaw direction may be changed to one-sixth of the threshold of when a fixed focal length lens having a focal length of 50 mm is mounted.

Returning to the explanations of FIGS. 3A and 3B, steps S308 to S322 are processing for detecting the focus on the object to be tracked and displaying the focused state. Note that in steps S319 and S320, the state where the camera or the object is moving corresponds to the state where the position of the object in the captured image is moving by an amount that is not less than a predetermined amount, and the state where the camera and the object is not moving represents the state where the position of the object in the captured image is not moving by the amount that is not less than the predetermined amount.

In step S308, the system control unit 201 determines whether the shutter-release button 102 is pressed halfway by the photographer and the first shutter switch signal SW1 is turned on, and the shooting preparation instruction is input. If it is determined that the shooting preparation instruction has been input, the processing proceeds to step S309, and if not, the determination processing of step S308 is repeated, and the state in which the detected region of the object is displayed on the backside display unit 101 is continued.

In step S309, the system control unit 201 executes photometric processing for determining the exposure at the time of shooting. In the photometric processing, an AE sensor (not shown) accumulates image signal of an object at in a predetermined time. A predetermined time is the exposure time required when the AE sensor measures brightness, and follows a predetermined program diagram. Since the program diagram is a known technique, a detailed description thereof will be omitted. Then, the AE sensor reads the accumulated image signal and holds it in the memory 232, photometric calculation processing is performed based on the image held in the memory 232, and the brightness of the photometric target region is measured. Since the photometric calculation processing is well known, a detailed description thereof will be omitted.

In step S310, the system control unit 201 performs the focus detection processing on the detected region of the object acquired in step S303 by the focus detection unit 257.

In step S311, the system control unit 201 drives the focus lens of the lens unit 200 according to the defocus amount in the focus detected region calculated by the focus detection unit 257 using a known method.

In step S312, the system control unit 201 determines whether or not it is the focusing state based on the defocus amount calculated in step S311. If the defocus amount is smaller than the predetermined threshold, it is determined to be in the in-focus state, and the processing proceeds to step S315, and otherwise, the processing proceeds to step S313.

In step S313, the system control unit 201 switches the detected region of the object that has been already displayed on the backside display unit 101 in step S305 or S307 to the non-focusing display state. The non-focusing display includes, for example, changing the color information with respect to the first display appearance and the second display appearance indicating the detected region of the object that has been displayed so far, but the present invention is not limited thereto.

In step S314, the system control unit 201 determines whether or not the shooting preparation instruction is continuously input. If it is determined that the shooting preparation instruction is continuously input, the processing proceeds to step S311 and the system control unit 201 drives the focusing lens again based on the defocusing amount. If not, the processing returns to step S301.

In step S315, the system control unit 201 acquires information of the in-focus region of the object by the focus detection unit 257.

In step S316, the system control unit 201 switches the detected region of the object displayed on the backside display unit 101 in step S306 or step S307 to the non-display state.

In step S317, the system control unit 201 determines whether the present AF mode is the servo AF or one-shot AF. When it is determined to be the servo AF, the processing proceeds to step S319, and when it is determined to be the one shot AF, the processing proceeds step S318.

In step S318, the system control unit 201 displays the in-focus region of the object displayed on the backside display unit 101, keeping the display appearance of when the shooting preparation instruction was input, in the first display appearance (outer peripheral frame) or the second display appearance (grid shape). In step S318, the outer peripheral frame may be displayed regardless of the display appearance when the shooting preparation instruction is input.

In step S319, the system control unit 201 determines, based on the information acquired by the attitude detection unit 255, whether or not the digital camera 100 is moving by an amount that is not less than a predetermined amount, that is, the photographer is moving the digital camera 100 at a predetermined amount or more of speed. If it is determined that the digital camera 100 is moving, then the processing proceeds to step S322, and otherwise, the processing proceeds to step S320. The predetermined amount indicates, for example, rotation at an angle of 90 degrees or more or 60 degrees or more per second.

In step S320, the system control unit 201 determines whether or not the detected object is moving based on the motion vector amount of the object calculated by the motion vector calculation unit 224b of the image processing unit 224.

If it is determined that the detected object is moving, the processing proceeds to step S322, and otherwise, the processing proceeds to step S321.

In step S321, the system control unit 201 superimposes and displays the in-focus region acquired in step S315 on the live view displayed on the backside display unit 101 in the first display appearance, i.e., the outer peripheral frame.

In step S322, the system control unit 201 superimposes and displays the in-focus region acquired in step S315 on the live view displayed on the backside display unit 101 in the second display appearance.

As described above, when the current AF mode is the servo AF, the first display appearance or the second display appearance is determined based on whether or not the camera or the object is moving while the shooting preparation instruction is input.

Note that in steps S321 and S322, similarly to the detected region information of the object in steps S306 and S307, the in-focus region is displayed in the first display appearance or the second display appearance by dividing the region that can be focused in the display area of the backside display unit 101 into rectangular regions of the same shape, with respect to the sum of sets of regions of the rectangles corresponding to the focusing region information obtained from the focus detection unit 257. However, the region that can be focused may not necessarily coincide with the object detectable area, and also may not coincide with the display area of the backside display unit 101.

In step S323, the system control unit 201 determines whether or not a shooting preparation instruction is input. If it is determined that an instruction to prepare for shooting has been input, the processing proceeds to step S325, and otherwise, the processing proceeds to step S324.

In step S324, the system control unit 201 switches the in-focus region of the object displayed on the backside display unit 101 in step S321 or S322 to non-display state, the processing returns to step S301, and repeats the subsequent processing.

In step S325, the system control unit 201 determines whether or not the shutter-release button 102 is fully pressed by the photographer and the second shutter switch signal SW2 is turned on, and the shooting instruction is input. If it is determined that the shooting instruction has been input, the processing proceeds to step S327, and otherwise, the processing proceeds to step S326.

In step S326, the system control unit 201 determines whether the present AF mode is servo AF or one-shot AF. When it is determined to be the servo AF, the processing proceeds to step S309, and when it is determined to be the one-shot AF, the processing proceeds to step S323. In step S327, the system control unit 201 executes shooting processing.

In step S328, the system control unit 201 determines whether to terminate the processing by the operation such as the power switch being turned off or the switching instruction to another operation mode being input, and if it is determined to terminate the processing, the processing is ended, and if not, the processing returns to step S301, and the subsequent processing is repeated.

As described above, when the current AF mode is the servo AF mode, the first display appearance or the second display appearance is determined based on whether or not the camera or the object is moving while the shooting preparation instruction is input. On the other hand, when the current AF mode is the one-shot AF mode, the display appearance is controlled so as not to change the display appearance when the shooting preparation instruction is input until the shooting preparation instruction is canceled.

Next, with reference to FIGS. 7 and 8, the display control processing of the first display appearance in steps S306 and S321 of FIGS. 3A and 3B (outer peripheral frame) will be described.

Figure 7:
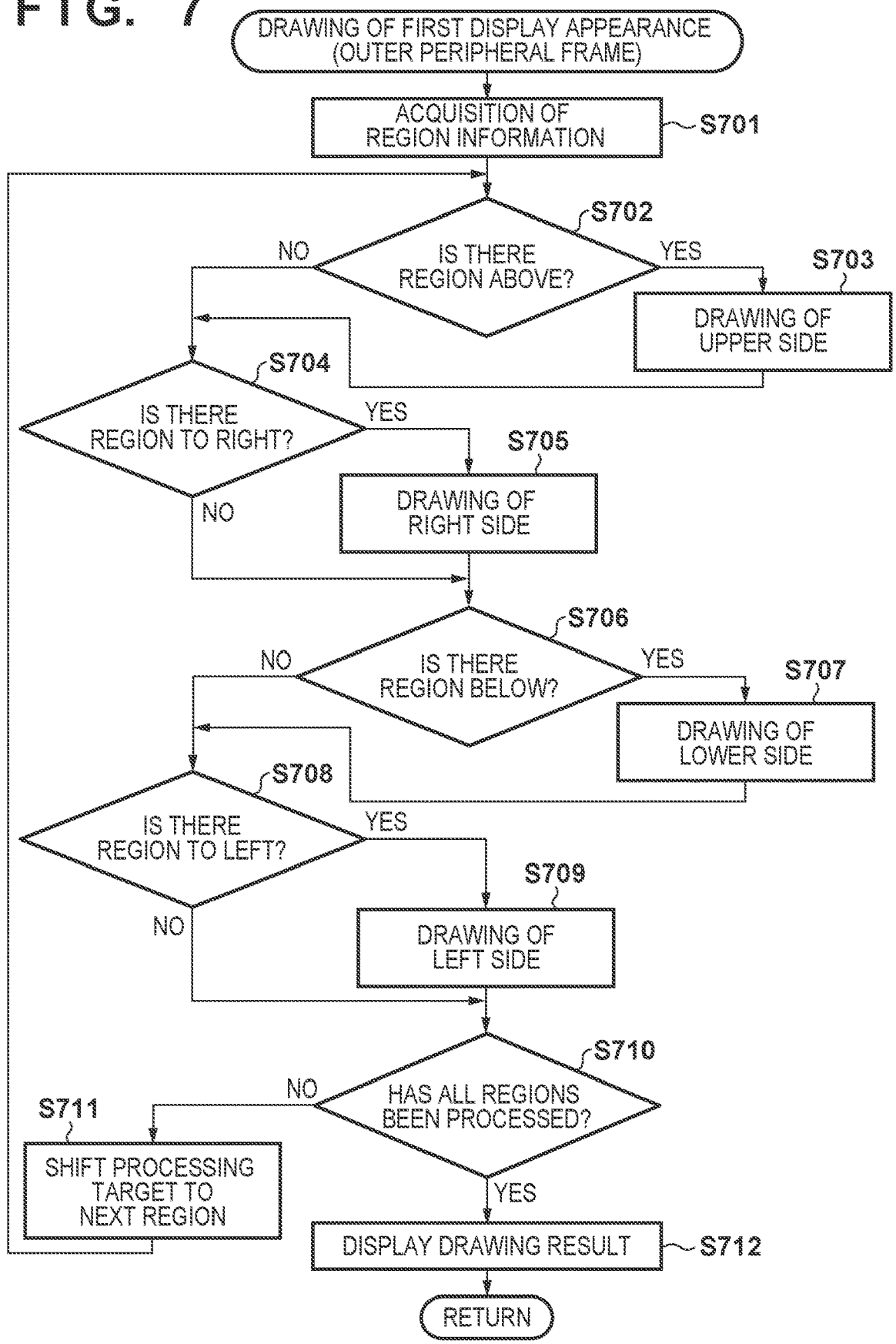
FIG. 7 is a flowchart illustrating processing of steps S306 and S321 of FIGS. 3A and 3B.

FIG. 7 shows processing of acquiring information relating to a detected region or an in-focus region of an object in steps S306 and S321 of FIGS. 3A and 3B and drawing the information in the first display appearance. In the present embodiment, as shown in FIGS. 5A and 5B, the display area of the backside display unit 101 is divided into rectangular regions of the same shape, and the image processing unit 224 holds information as two-dimensional array information [X] [Y] as to whether or not part of the object overlaps each of the rectangular regions.

Figure 8:
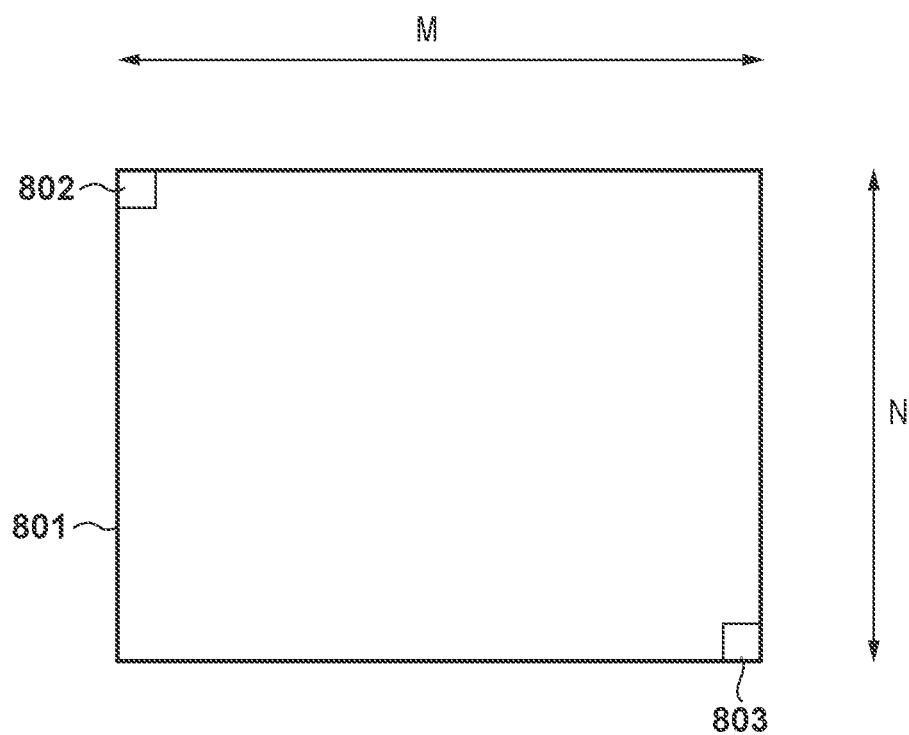
FIG. 8 is a diagram illustrating drawing processing of a first display appearance of FIG. 7.

FIG. 8 shows a state in which a display region 801 of the backside display unit 101 is divided into horizontal M pieces and vertical N pieces of the square rectangle of the same shape. The square rectangle 802 corresponds to information [0][0], which is the head of the two-dimensional array information [X][Y], and the square rectangle 803 corresponds to information [M−1][N−1], which is the end of the two-dimensional array information [X][Y]. In each array corresponding to the divided rectangular region, 1 is stored when the region overlaps at least part of the object, and 0 is stored when the region does not overlap at least part of the object. The information on the detected region of the object is not limited to the two-dimensional array, and the value is not limited to 0 or 1.

In step S701, the system control unit 201 acquires the two-dimensional array information [X] [Y], which is the region information of the object, from the image processing unit 224.

In step S702, the system control unit 201 determines, based on the two-dimensional array information [X] [Y] acquired in step S701, among the divided rectangular regions overlapping at least part of the object, whether or not there is a divided rectangular region which overlaps at least part of the object on the divided rectangle that is currently being determined. That is, it is determined whether or not there is a divided rectangular region at a position above from the divided rectangular region that is currently being determined (next to the upward direction) in the region of the backside display unit 101. If it is determined that there is not a rectangular region which overlaps part of the object at a position above from the divided rectangular region that is currently being determined, the processing proceeds to step S703, and otherwise, the processing proceeds to step S704.

In step S703, the system control unit 201 draws the upper side of the square rectangle.

In step S704, the system control unit 201 determines, based on the two-dimensional array information [X] [Y] acquired in step S701, among the divided rectangular regions overlapping at least part of the object, whether or not there is a divided rectangular region which overlaps at least part of the object on the divided rectangle that is currently being determined. That is, it is determined whether or not there is a divided rectangular region at a positon right from the divided rectangular region that is currently being determined (next to the right direction) in the region of the backside display unit 101. If it is determined that there is not a rectangular region which overlaps part of the object at a position right from the divided rectangular region currently being determined, the processing proceeds to step S705, and if not, the processing proceeds to step S706.

In step S705, the system control unit 201 draws the right side of a square rectangle.

In step S706, the system control unit 201 determines, based on the two-dimensional array information [X] [Y] acquired in step S701, among the divided rectangular regions overlapping at least part of the object, whether or not there is a divided rectangular region which overlaps at least part of the object on the divided rectangle that is currently being determined. That is, it is determined whether or not there is a divided rectangular region at a position below from the divided rectangular region that is currently being determined (next to the downward direction) in the region of the backside display unit 101. If it is determined that there is not a rectangular region which overlaps part of the object at a position below from the divided rectangular region that is currently being determined, the processing proceeds to step S707, and if not, the processing proceeds to step S708.

In step S707, the system control unit 201 draws the lower side of the square rectangle.

In step S708, the system control unit 201 determines, based on the two-dimensional array information [X] [Y] acquired in step S701, among the divided rectangular regions overlapping at least part of the object, whether or not there is a divided rectangular region which overlaps at least part of the object on the divided rectangular region that is currently being determined. That is, it is determined whether or not there is a divided rectangular region at a position left from the divided rectangular region that is currently being determined (next to the left direction) in the region of the backside display unit 101. If it is determined that there is not a rectangular region which overlaps part of the object at a position left from the divided rectangular region that is currently being determined, the processing proceeds to step S709, and if not, the processing proceeds to step S710.

In step S709, the system control unit 201 draws the left side of the square rectangle.

In step S710, the system control unit 201 determines whether or not all the divided rectangular regions have been processed. If it is determined that all the divided rectangular regions have been processed, the processing proceeds to step S712, and otherwise, the processing proceeds to step S711.

In step S711, the system control unit 201 shifts the processing target to a next divided rectangular region, and the processing proceeds to step S702. In the two-dimensional array information [X] [Y], X=X+1 when X+1<M−1 is satisfied, X=0, and otherwise, Y=Y+1.

In step S712, the system control unit 201 displays the drawing result of the first display appearance relating to the detected region of the object on the backside display unit 101 and ends the processing.

Although in the present embodiment, an example has been described in which the graphics indicating the detected region and the focusing region of the object are displayed on the backside display unit 101 of the digital camera 100, the display destination may be an external display by the in-finder display unit 229 or HDMI® outputting.

The first display appearance is not limited to the outer peripheral frame, it may be a display appearance without displaying the AF frame, or indicating four corners of the AF frame by dots (points) or displaying a dot at the center position of the AF frame, a display appearance in which an illuminance is reduced. That is, the region superimposed on the object is smaller than the normal AF frame, it may be enough if the display appearance increase the visibility of the object.

As described above, according to the present embodiment, when the predetermined condition including the fact that the position of the object of the tracking target or the focusing target in the image does not move by a predetermined amount or more is satisfied, the region indicating the object is displayed in the first display appearance, and when the predetermined condition is not satisfied, the region indicating the object is displayed in the second display appearance in which the visibility of the object is lower than that of the first display appearance. By performing the display control in such way, it is possible to improve the visibility of the region of the object to be processed, such as tracking and focusing.

Note that the foregoing various control described as something that the system control unit 201 performs may be performed by one piece of hardware, and a plurality of pieces of hardware may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The foregoing embodiment describes an example of a case where the present invention is applied in a single-lens reflex digital camera. However, the present invention is not limited to this example. The present invention can be applied to an apparatus having a function of displaying a region for performing a specific processing such as tracking processing or focusing processing. That is, the present invention can be applied in personal computers, PDAs, mobile phones, smart phones which are a type of mobile phones, portable image viewers, digital photo frames, music players, game consoles, e-book readers, tablet PCs, projection apparatuses, home electronic apparatuses, in-vehicle apparatuses, medical equipment, electronic binoculars, or the like.

Further, the present invention is not limited to the camera body and is also applicable to a control device for communicating with a camera (including a network camera via a wired or wireless communication and remotely controlling the camera. Apparatuses for remotely controlling the camera include, for example, smart-phones, tablet PCs, desktop PCs, and the like. Based on the operation performed on the control device side or the processing performed on the control device side, it is possible to remotely control the image capturing device by notifying the image capturing device of commands for performing various operations and settings from the control device side. Alternatively, the live view image captured by the image capturing apparatus may be received via wired or wireless communication and displayed on the control apparatus side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-042184, filed Mar. 11, 2020 which is hereby incorporated by reference herein in its entirety.

What is claimed is:

1. An electronic apparatus comprising:
at least one processor and/or at least one circuit to perform operations of:
in a case that an object included in a captured image is not moving, indicating a region of the captured image corresponding to the object in a first display appearance, and
in a case that the object is moving in the captured image, indicating the region in a second display appearance that is at least different in shape from the first display appearance,
wherein the region is a target region to be subject to focus processing and the focus processing is first focus processing for focusing on a stationary object, and
wherein the processor does not change a display appearance of the region while a display appearance at the time of a shooting preparation instruction is maintained until the shooting preparation instruction is cancelled.

2. The apparatus according to claim 1, wherein in a case that an image capture apparatus for capturing the captured image is moving, the processor determines that the object is moving in the captured image.

3. The apparatus according to claim 1, wherein in a case that it is determined by the focusing processing that the region is not in focus, the processor indicates the region in a third display appearance.

4. The apparatus according to claim 1, wherein the focus processing is second focus processing for focusing on a moving object, and in a case that the object is moving in the captured image while the shooting preparation instruction is being made, the processor indicates the region in the first display appearance, and in a case that the object is not moving in the captured image, the processor indicates the region in the second display appearance.

5. The apparatus according to claim 1, wherein the region indicates a target object to be tracked in the captured image.

6. The apparatus according to claim 1, wherein the first display appearance is a display appearance in which an outline of a region indicating the object is displayed by a frame or a dot.

7. The apparatus according to claim 6, wherein the second display appearance is a display appearance in which the outline of each unit region included in the region indicating the object is indicated by a frame.

8. A method of controlling an electronic apparatus, the method comprising:
controlling such that in a case that an object included in a captured image is not moving, a region of the captured image corresponding to the object is indicated in a first display appearance, and
in a case that the object is moving in the captured image, the region is indicated in a second display appearance that is at least different in shape from that of the first display appearance, wherein the region is a target region to be subjected to focus processing and the focus processing is first focus processing for focusing on a stationary object, and wherein, in the controlling, a display appearance of the region is not changed while a display appearance at the time of a shooting preparation instruction is maintained until the shooting preparation instruction is released.

9. The method according to claim 8, wherein in the controlling, in a case that an image capture apparatus for capturing the captured image is moving, it is determined that the object is moving in the captured image.

10. The method according to claim 8, wherein in the controlling, in a case that it is determined by the focus processing that the region is not in focus, the region is indicated in a third display appearance.

11. The method according to claim 8, wherein the focus processing is processing for focusing on a moving object, and in the controlling, in a case that the object is moving in the captured image while the shooting preparation instruction is being made, the region is indicated in the first display appearance, and in a case that the object is not moving in the captured image, the region is indicated in the second display appearance.

12. The method according to claim 8, wherein the region indicates a target object to be tracked in the captured image.

13. The method according to claim 8, wherein the first display appearance is a display appearance in which an outline of a region indicating the object is displayed by a frame or a dot.

14. The method according to claim 13, wherein the second display appearance is a display appearance in which the outline of each unit region included in the region indicating the object is indicated by a frame.

15. A non-transitory computer-readable storage medium storing a program for causing a computer to execute operations of:

controlling such that in a case that an object included in a captured image is not moving, a region of the captured image corresponding to the object is indicated in a first display appearance, and in a case that the object is moving in the captured image, the region is indicated in a second display appearance that is at least different in shape from that of the first display appearance, wherein the region is a target region to be subjected to focus processing and the focus processing is first focus processing for focusing on a stationary object, and wherein, in the controlling, a display appearance of the region is not changed while a display appearance at the time of a shooting preparation instruction is maintained until the shooting preparation instruction is released.

16. An electronic apparatus comprising:

at least one processor and/or at least one circuit to perform operations of:

displaying on a screen of a display unit, a captured image and a graphic indicating a region corresponding to an object included in the captured image, wherein the region is configured by of at least one of a plurality of unit regions included in the screen; and in a case that the region includes two or more unit regions, an outer peripheral frame of the region and an inner grid of the region are displayed in difference display appearances each other in the graphic to be displayed on the screen, wherein the region is a target region to be subjected to focus processing and the focus processing is first focus processing for focusing on a stationary object, and wherein the processor does not change a display appearance of the region while a display appearance at the time of a shooting preparation instruction is maintained until the shooting preparation instruction is cancelled.

17. The apparatus according to claim 16, wherein the inner grind is represented by a line having a higher transparency than the outer peripheral frame.

18. The apparatus according to claim 16, wherein the inner grind is represented by a line that is thinner than the line of the outer peripheral frame.

19. The apparatus according to claim 16, wherein the inner grind is represented by a line having a lower illuminance than the outer peripheral frame.

20. The apparatus according to claim 16, wherein the display appearance of the graphic further differs depending on whether the object is moving or not.

21. The apparatus according to claim 16, wherein an automatic focus processing is executed on the region corresponding to the object in response to a shooting preparation instruction.

22. A method of controlling an electronic apparatus, the method comprising:

displaying on a screen of a display unit, a captured image and a graphic indicating a region corresponding to an object included in the captured image, wherein the region is configured by of at least one of a plurality of unit regions included in the screen, and in the displaying, in a case that the region includes two or more unit regions, an outer peripheral frame of the region and an inner grid of the region are displayed in difference display appearances each other in the graphic to be displayed on the screen, wherein the region is a target region to be subjected to focus processing and the focus processing is first focus processing for focusing on a stationary object, and wherein a display appearance of the region is not changed while a display appearance at the time of a shooting preparation instruction is maintained until the shooting preparation instruction is released.

23. The method according to claim 22, wherein the inner grind is represented by a line having a higher transparency than the outer peripheral frame.

24. The method according to claim 22, wherein the inner grind is represented by a line that is thinner than the line of the outer peripheral frame.

25. The method according to claim 22, wherein the inner grind is represented by a line having a lower illuminance than the outer peripheral frame.

26. The method according to claim 22, wherein the display appearance of the graphic further differs depending on whether the object is moving or not.

27. The method according to claim 22, wherein an automatic focus processing is executed on the region corresponding to the object in response to a shooting preparation instruction.

28. A non-transitory computer-readable storage medium storing a program for causing a computer to execute operations of:

displaying on a screen of a display unit, a captured image and a graphic indicating a region corresponding to an object included in the captured image, wherein the region is configured by of at least one of a plurality of unit regions included in the screen, and in a case that the region includes two or more unit regions, an outer peripheral frame of the region and an inner grid of the region are displayed in difference display appearances each other in the graphic to be displayed on the screen, wherein the region is a target region to be subjected to focus processing and the focus processing is first focus processing for focusing on a stationary object, and wherein a display appearance of the region is not changed while a display appearance at the time of a shooting preparation instruction is maintained until the shooting preparation instruction is released.

* * * * *